Sept. 1, 1959     A. R. SALTZMAN     2,901,893
THERMAL DIFFUSION DESORPTION COOLING SYSTEM
Filed May 24, 1956     2 Sheets-Sheet 1
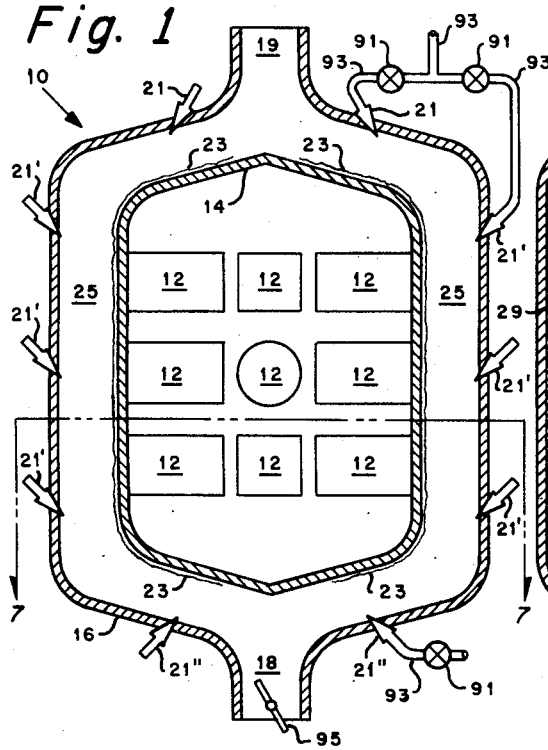
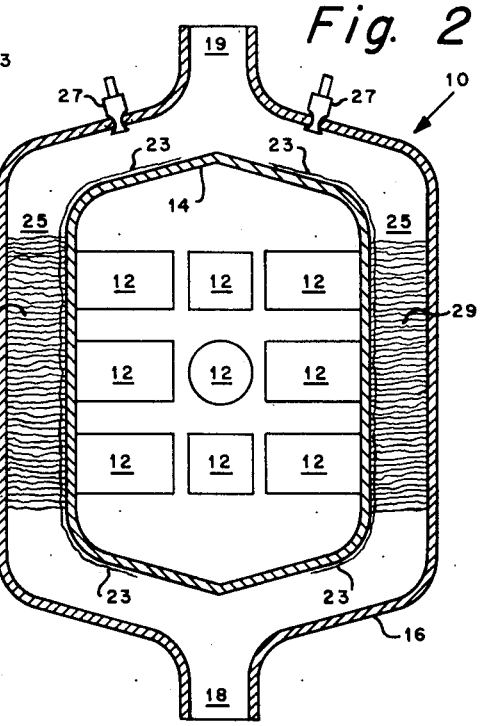

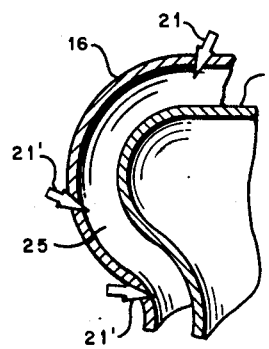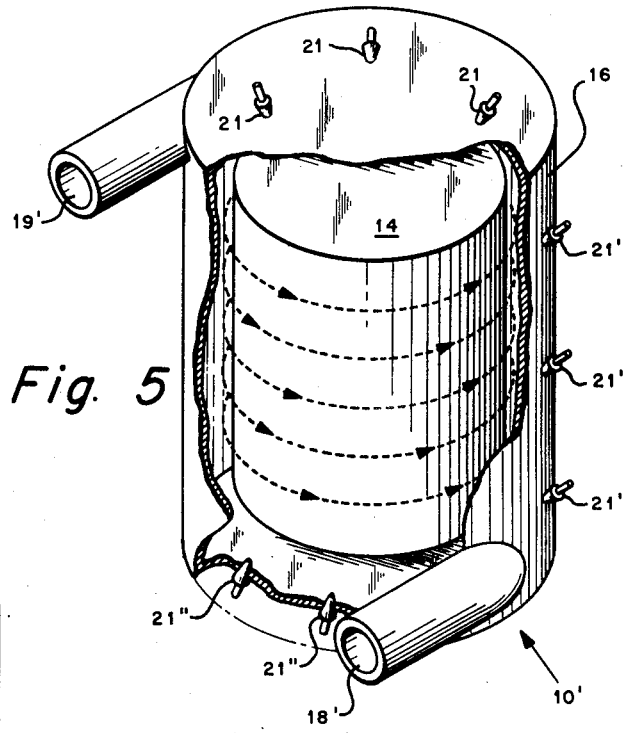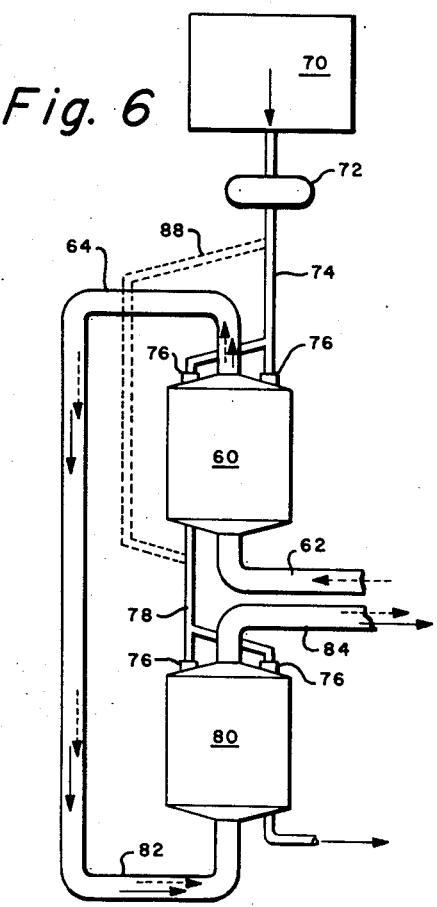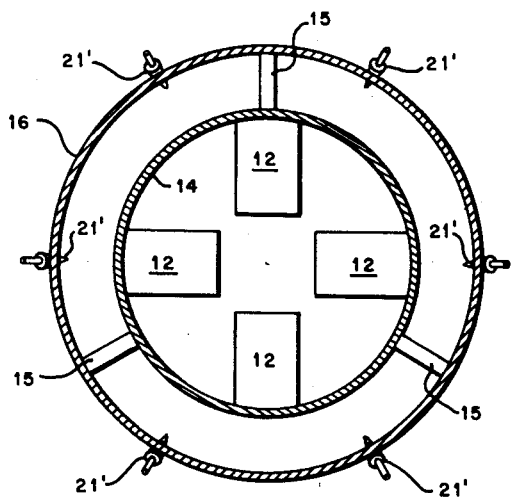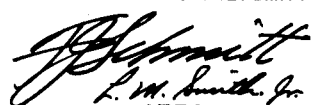

United States Patent Office 2,901,893
Patented Sept. 1, 1959

2,901,893

THERMAL DIFFUSION DESORPTION COOLING SYSTEM

Alvin R. Saltzman, Willow Grove, Pa.

Application May 24, 1956, Serial No. 587,183

30 Claims. (Cl. 62—314)

(Granted under Title 35, U.S. Code (1952), sec. 266)

The invention described herein may be manufactured and used by or for the Government of the United States of America for governmental purposes without the payment of any royalties thereon or therefor.

The instant invention relates to a thermal diffusion desorption cooling system, and more particularly to a thermal diffusion desorption cooling system for electronic equipment employing a liquid in combination with an inert gas serving as a carrier of vapor heat, thus achieving cooling by simultaneous heat, mass and momentum transfer.

Perhaps the most common method of cooling airborne electronic equipment to date involves the circulation of air within the interior of an aircraft airframe by simple convection or by auxiliary means such as blowers in order to employ the exterior surface of an aircraft as a convenient heat sink to dissipate the substantial quantities of heat generated by electronic equipment in operation. This well-known arrangement has an inherent limitation in that it requires a favorable temperature differential between the operating temperature level of electronic equipment to be cooled and the normal temperature of the skin of an aircraft in flight, in order to provide the requisite heat sink. In the past, this limitation did not pose serious problems because the tremendous quantities of air flowing over the surface of an aircraft in flight served to maintain this surface at temperature well below safe operating temperatures for electronic equipment. However, the rapidly increasing flight speeds characteristic of current aircraft designs and the substantially increased flight speeds anticipated for future designs necessarily involve very substantial changes in the energy of the air adjacent to the surface of an aircraft flying at such speeds as a result of the contact of the air with the surface. Unfortunately, this substantial change in energy produces aircraft skin temperatures so high that heat is actually flowing from the skin of the aircraft into the airframe to intensify the heat in the interior area surrounding airborne electronic equipment.

Another well-known method of cooling airborne electronic equipment relies upon the introduction of ram air into the spaces within an airframe surrounding electronic equipment mounted therein, in order to cool the exterior surfaces of such equipment and thereby endeavor to reduce the operating temperatures of the various components within such equipment to a safe level. Regrettably this method of cooling also has inherent practical limitations which severely limit its utility in current aircraft designs. The most severe cooling condition encountered by a ram air cooling system generally occurs at sea level at the maximum Mach number, which frequently approaches unity for current aircraft designs, with the result that the ram air used as the coolant in this method itself reaches a temperature as high as 216 degrees F., much above the maximum operating temperature allowable for various electronic components currently in use, such as resistors and transformers. Moreover, since this method is typically used to cool only the exterior surface of the housing or container for electronic equipment, the temperature surrounding various components particularly within a pressurized assembly will quickly reach a level even higher than that of the coolant being used. On the other hand, at very high altitudes approaching 60,000 ft., which are presently becoming operational levels, the air density is so substantially reduced that the flow of ram air that are of adequate capacity at sea level would have to be increased in capacity by a factor of more than ten times at such high altitudes to compensate for the variation in air density. Hence, any effort to extend the capabilities of ram air cooling systems by the use of auxiliary blowers is handicapped by this severe design requirement for the blowers due to the extreme diversity in operating conditions currently encountered.

Alternatively, a refrigerating system installed in an aircraft may be used for the purpose of cooling the electronic equipment mounted therein. This cooling technique is not widely accepted or used because it entails the use of an installation including various elements of refrigeration equipment, thus contributing substantial additional weight in the face of the severe weight and space limitations imposed upon aircraft design. Moreover, known types of refrigeration equipment are characteristically limited to relatively inefficient performance under certain aircraft operating conditions, particularly at high altitudes and in high temperature environments which characterize the operation of modern aircraft at very high speeds.

Finally, in addition to the fact that rapidly increasing aircraft operating speeds and higher operating altitudes for aircraft are already intensifying the problems involved in adequately cooling airborne electronic equipment due to the practical limitations of the known methods of cooling enumerated above, steadily increasing demands for more compact, miniaturized airborn electronic equipment further magnifies these problems, because the installation of increased numbers of components in a given space within electronic equipment results in the generation of more heat per unit volume which must be dissipated in order to maintain equipment at safe operating temperature levels.

The instant invention contemplates the use of a combination of air and water vapor or other liquid vapor intermixed to form a coolant mixture in which the air is relegated to a subordinate role as an inert carrier for water vapor or other vapor diffused therein. With the arrangement characterizing the instant invention, the coolant thus formed for airborne electronic equipment achieves a greater over-all heat capacity with a substantially smaller temperature rise for a unit change in enthalpy than air alone. Accordingly, the cooling process involved here must be considered as a "desorption" process in which an inert carrier gas, such as air, running either current or countercurrent to a suitable liquid spray or stream takes advantage of the fact that under suitable conditions heat transfer, mass transfer, and momentum transfer are intimately related, occur concurrently, and may be selectively combined for maximum cooling effect. The substantial advantages of the instant invention over a conventional blast or ram air cooling system, for example, are illustrated both by a theoretical comparison of the respective systems and by an analysis of the results of comparative tests found on pages 14 through 18 of Report No. NADC–EL–5542 entitled Interim Report Evaporative Spray Tower System for Cooling the AN/APS–30 Series Modulator of the Aeronautical Electronic and Electrical Laboratory at the U.S. Naval Air Development Center.

While the device of the instant invention superficially resembles conventional heat exchanger assemblies to the extent that it makes use of two different fluids, for example, air and water, in achieving a cooling effect, there are numerous significant and, in fact, fundamental differences between the instant invention and conventional heat exchanger assemblies. It is common practice in conventional heat exchanger assemblies to employ a heat conductive fluid such as water and a coolant fluid such as air, but conventional heat exchanger configurations include a metal wall interposed between the heat conducting fluid and the coolant which necessarily constitutes a thermal resistance tending to retard or diminish heat transfer. Notwithstanding the fact that the instant invention also employs a fluid such as water and a gas such as air, as does a conventional heat exchanger, the device characterizing this invention eliminates an intermediate wall between the respective fluids, thereby eliminating thermal resistance due to the wall itself and the additional thermal resistances caused by the inevitable laminar films adjacent the respective surfaces of such an intermediate wall. Furthermore, a typical heat exchanger assembly uses a fluid such as air as the sole means for the ultimate extraction of heat and for no other purpose. In contrast, the instant invention employs air primarily as a carrier of vapor heat, in which capacity a reduced amount of air is required, thereby reducing the momentum drag of air received through a scoop in an aircraft ram for this purpose, in order to reduce the expenditure of aircraft fuel for overcoming momentum drag. In conventional air cooled heat exchanger assemblies the cooling effect achieved is limited by the relatively poor heat capacity of air, about $$\frac{.24 \text{ B.t.u.}}{\text{hr., sq. ft., } ° \text{F.}}$$

On the other hand, the instant invention, in which air or another suitable gas is either mixed with water vapor or some other suitable fluid vapor, takes advantage of the much greater heat capacity of water and of water vapor as well as that of air to achieve substantially increased cooling. In addition, it is characteristic of conventional heat exchangers that the coolant fluid, such as air, is necessarily discharged at a temperature substantially higher than its temperature at the inlet. Conversely, the operation of the device characterizing the instant invention is such that the air employed in the cooling operation is discharged at a lower dry bulb temperature than its inlet condition due to substantial evaporation of the liquid intermixed therewith which results in a change in the enthalpy of the fluid discharged, which is a combination of air and vapor. Concurrently, the liquid discharged as such is reduced in temperature by the rapid rate of evaporation. Moreover, conventional heat exchangers are inherently incapable of effecting the substantial cooling which may be achieved by turbulent mixing, as a practical matter, because the desirable degree of turbulent mixing can generally be achieved only by generating high velocities of fluid flow within the heat exchanger with the consequent expenditure of a substantial amount of power to operate suitable pumps or blowers. Consequently, heat exchangers are typically capable only of laminar flow with attendant low coefficients of heat transfer and thermal conductance which must be accepted in the absence of the undesirable alternative noted above. On the other hand, the instant invention involves a design configuration in which the substantial advantage of turbulent mixing is achieved without high velocities of fluid flow by an artificial stimulus in the form of substantial quantities of liquid droplets flowing either current or countercurrent to the airstream at low velocities. Finally, conventional heat exchanger assemblies are customarily constructed as separate components, which components when used to cool airborne electronic equipment, impose significant weight and space penalties on the installation. Conversely, in the device comprising the instant invention, the structural elements forming the cooling tower of this device may also be employed as the equipment chassis in order to minimize weight and space penalties incident to the inclusion of this device for cooling electronic equipment. In addition, this characteristic of the instant invention permits its incorporation in critical areas within electronic assemblies adjacent to the particular electronic components where it is most needed.

Over and above the deficiencies and limitations of conventional heat exchangers in comparison to the device of the instant invention, as noted above, the device of the instant invention relies upon simultaneous heat and mass transfer for its substantially enhanced cooling effect as compared to conventional heat exchangers which must necessarily depend solely upon conventional heat transfer. Furthermore, the instant invention takes advantage of the latent heat of vaporization by providing for vaporization of a liquid at low dry bulb temperatures substantially below the boiling point of the liquid and thus maintains a relatively low environmental temperature, while conventional air cooled heat exchangers are so constructed that they are incapable of exploiting the latent heat of vaporization of the liquid used in such systems at relatively low temperatures substantially below the boiling point of the liquid. In addition, the characteristics of the device of the instant invention are such that cooling fluids may be used therein which demonstrate favorable changes in their integral heat of solution. For example, the fluid used may comprise a combination of liquids such as ammonia and water. With this combination, the ammonia diffuses out of the system more rapidly than the water so that its concentration is reduced with a resulting increase in the weight percentage of water, accompanied by an increasing integral heat of solution, which provides a means of removing additional heat from electronic equipment being cooled without a temperature rise in the cooling fluid. Moreover, the device of the instant invention, in its basic embodiment, relies upon substantial quantities of liquid spray droplets to provide the large surface area required for most effective heat transfer, with very little increase in weight, in contrast to conventional heat exchangers in which the provision of increased surface area customarily entails the provision of structural elements having a large amount of surface contact area disposed adjacent to the intermediate wall, such as a multiplicity of fins or equivalent structure with a substantial surface area, which involves a substantial weight and space penalty. Finally, and of great significance, the device of the instant invention may successfully make use of air as a carrier of vapor heat which enters at a higher temperature than the environment of the electronic components to be cooled by this device. This phenomenon is possible only by virtue of the design feature characteristic of this invention by which the surface of the wall which forms the inner surface of this device and also supports electronic components mounted thereon is provided with a rapidly moving cool liquid-thin film environment which acts as a protective temperature barrier with regard to the high temperature air entering the system, so that the electronic components mounted upon this wall "feel" only the temperature of the relatively cool liquid film moving over the surface of the wall and thereby maintain low temperatures of operation despite the presence of the high temperature air adjacent to the wall. In contrast, conventional heat exchangers assemblies are rendered inoperative in the absence of a favorable temperature differential for the coolant between the inlet and the outlet of the system.

In its basic concept, the device of the instant invention also somewhat resembles well-known cooling towers which find applications in various processes in which they serve primarily to transfer heat from a liquid to adjacent air or from circulating air to a liquid being passed through the tower. To this extent, the instant invention may be described as a cooling tower for electronic equipment or, more briefly, as an electronic cooling tower. While conventional cooling towers may be described thermodynamically as involving an adiabatic process because they are used primarily to transfer heat from a liquid to air or from air to a liquid without the introduction of heat from an external source, the electronic cooling tower of the instant invention must be described thermodynamically as involving a non-adiabatic process, since its principal function is the removal of substantial quantities of heat from the electronic equipment which it adjoins. Moreover, conventional cooling towers are generally substantial structures physically with dimensions measured in feet, for example, as much as 50 ft. in diameter and 100 ft. in height. Conversely, electronic cooling towers designed for cooling airborne electronic equipment must be constructed under severe weight and space limitations such that they may be of the order of one foot in height with a space between the diffusing surfaces thereof measured in fractions of an inch. Consequently, the effect of the encompassing surface or container for a conventional cooling tower, if any, is not significant and may be disregarded in considering critical design factors, while the enclosing walls of an electronic cooling tower which function as diffusing surfaces constitute critical factors in the design of such devices. In addition, conventional spray cooling towers normally include nozzles mounted only at the top of the tower with air moving countercurrent to the spray discharged from such nozzles. On the other hand, in electronic cooling towers, it is essential that various types of nozzles be located in different critical areas of such a device to perform diverse functions essential to its successful operation.

An object of the instant invention is the provision of a compact, light weight, highly efficient cooling device suitable for dissipating high heat concentrations within various types of aircraft performing various types of flight missions at various altitudes and speeds.

Another object is to provide a thermal diffusion cooling system for dissipating heat concentrations which is operable independently of temperature differentials between the coolant fluid used and the source of heat by providing means for substantially increasing the enthalpy of the coolant fluid.

Still another object is the provision of a thermal diffusion cooling system effective at high operating altitudes at which air density is so low that it does not provide sufficient ram air coolant.

A further object is the provision of a thermal diffusion cooling system for heat generating components in an aircraft operable during high sped low altitude flights on a small quantity of high temperature ram air, used as a carrier of vapor heat.

A final object of this invention is to provide a continuous cool liquid-thin film protective environment over the entire heat transfer surface of airborne electronic equipment to effectively shield such equipment from the high temperature ambient air immediately surrounding such equipment.

Other objects and many of the attendant advantages of this invention will be readily appreciated as the same becomes better understood by reference to the following detailed description when considered in connection with the accompanying drawings wherein:

Fig. 1 shows a schematic representation of a cross section of a preferred embodiment of the instant invention, including representations of nozzle assemblies disposed in various significant locations to assure effective operation of the instant invention, Fig. 2 is a schematic cross-sectional view which illustrates an alternate embodiment of the instant invention, including representations of orifice assemblies and packing substituted for various nozzle assemblies shown in the preferred embodiment, Fig. 3 represents a schematic cross-sectional view that shows yet another embodiment of the instant invention wherein the critical distribution of the liquid to be diffused is controlled by diffusing means other than nozzle assemblies, Fig. 4 comprises a schematic representation of a cross section of the embodiment illustrated in Fig. 1 combined with a supplemental cooling arrangement which alternatively may be combined with either of the embodiments illustrated in Figs. 2 and 3, Fig. 5 shows a partially broken away isometric view of a schematic representation of still another embodiment of the instant invention including nozzle assemblies arranged as indicated in Fig. 1 and also means for providing helical or spiral circulation of the gas which functions as a carrier of vapor heat, Fig. 6 is a simplified schematic showing of an arrangement by means of which two or more cooling devices constructed according to the teachings of the instant invention may be interconnected to cool heat sources operating at different temperature levels, Fig. 7 is a cross-sectional view taken on line 7—7 of Fig. 1, and Fig. 8 shows a broken away cross section of a representative complexly curved portion of the passageway formed by the device of the instant invention within which nozzle assemblies disposed as indicated must function effectively in accordance with the teachings of the instant invention.

Referring now to the drawings, wherein like reference numerals identify like or corresponding parts in each of the several views, Fig. 1 is a simplified representation of a device for cooling typical airborne electronic equipment, arranged according to the teachings of the instant invention. In considering the showing in Fig. 1 and in Figs. 2 through 5, it should be noted that the spacing of the respective surfaces between which the air or other gas is circulated is substantially exaggerated in relation to the size of the other elements shown in order to permit a clear showing of the relationship between various elements. Likewise, various components, described below as connected to elements illustrated, have not been shown in these views, in order to avoid obscuring salient features of the instant invention. In Fig. 1, in which the cooling device characterizing the instant invention is generally designated by reference numeral 10, the units 12 are simplified schematic representations of the various components of an electronic assembly, respectively secured to the inner surfaces of the relatively smaller inner container 14 which may conveniently be generally cylindrical and approximately a foot in height and diameter or of any other shape and size suitable to accommodate the particular electronic equipment to be cooled. The container 14, arranged substantially as shown, may effectively simultaneously perform two functions, first as the chassis of the electronic equipment enclosed thereby and second, as the primary heat transfer surface of the device comprising the instant invention. In this dual capacity, container 14 constitutes a highly effective heat transfer wall, since it may conveniently be fabricated from a suitable metallic material with a high heat conductivity, such as aluminum or the like. The container 14, in turn, is enclosed within a similarly shaped and slightly larger outer container 16 forming the outer surface of the cooling device of the instant invention. The container 16, which may be cylindrical, as illustrated, or of any other shape corresponding to that of the inner container 14 with which it is associated, may be fabricated from sheet metal, or, if necessary, in the presence of an unfavorable temperature differential with respect to its environment, from rigid material with a low heat conductivity such as cellulose acetate, ceramic, or other suitable non-metallic substance. In order to maintain the proper spacing between the respective containers 14 and 16 constituting the annular passageway 25, the inner container 14 may be supported fixedly within the outer container 16 by any suitable supporting means, such as struts, spreaders or spacers arranged for minimum interference with the flow of fluid through the passageway 25. While such supporting means are not visible in Fig. 1, supporting struts 15 are shown in Fig. 7, taken along line 7—7 of Fig. 1, so disposed as to maintain a fixed relationship between containers 14 and 16 and to insure proper spacing at all points between the outer surface of container 14 and the inner surface of container 16. The outer container 16 includes an inlet opening 18, which may be conveniently located at the lower end of container 16, arranged to admit ram air or other gas to be used as a carrier of vapor heat, and an outlet opening 19, which may conveniently be located at the upper end of container 16, through which a mixture of air or other gas and the fluid vapors evolved within the passageway 25 may be discharged. The showing in Fig. 1 also includes schematic representations of various nozzle assemblies 21, 21' and 21" with nozzle assemblies 21' and 21" directed countercurrent to the flow of air. It should be noted that the various nozzles in different locations must have unique characteristics adapting these nozzle assemblies to meet the critical design limitations which apply in the area in which they are located. For example, the nozzles 21, have the primary function of distributing fluid discharged thereby over the outer surface of the upper end of container 14 to establish a rapidly moving cool liquid-thin film protective environment 23 extending downwardly over the outer surface of container 14, and thereby provide for the mass transfer of heat from the liquid to the air by this means as well as by the turbulent diffusion effected by nozzles 21' and 21", as described below. The several nozzles 21' projecting inwardly through the side walls of outer container 16 have two major functions including the generation of very large numbers of very small droplets of the liquid discharged thereby in order to provide maximum liquid surface for most effective diffusion of the liquid contained in these droplets into the air or other gas being circulated through the passageway 25 between the inner surface of the container 16 and the outer surface of container 14, and, in addition, nozzles 21' must deposit sufficient liquid upon the outer surface of container 14 to maintain the rapidly moving cool liquid-thin film protective environment 23 moving down the outer surface of container 14. Finally, nozzle assemblies 21" disposed immediately adjacent to the inlet 18 through which a gas, such as ram air, is admitted are provided to insure an initial rapid diffusion of liquid vapor into the air as it is admitted by artificially stimulating turbulent flow and thereby effecting the earliest possible rapid increase in the air-liquid vapor mixture resulting. Hence, the configuration of the various nozzle assemblies to insure their most effective performance must be determined with great care since these nozzle assemblies are required to perform their necessary functions within the narrow confines of the passageway 25 which typically has transverse dimensions measured in fractions of an inch. For example, the reconciliation of the strict space limitations which are an inherent factor in aircraft design and the size and shapes of various components of the electronic equipment to be installed in an aircraft may lead to the use of containers as cooperating elements of the instant invention which define a passageway 25 therebetween which may embody complex curvatures such as that shown in the segmental representation in Fig. 8 with the respective bounding surfaces spaced a fraction of an inch apart. In such an environment, effective operation of the cooling device can only be achieved with nozzle assemblies 21' discharging into the passageway 25 that are designed and disposed to generate a spray pattern approximating the shape and space limitations of the adjacent portions of the passageway as closely as possible and including the requisite size and quantity of droplets.

In connection with the operation of the instant invention, it is worthy of note that its operation is fully consistent with the Whitman two film concept and with the known techniques of simultaneous transfer of heat by mass transfer.

In operation, the embodiment of the instant invention illustrated in Fig. 1 is effective to cool electronic equipment composed of the components 12 represented schematically in Fig. 1. When such electronic equipment is in operation, particularly over extended periods, within the narrow confines of an airframe, the various components 12 generate substantial quantities of heat, which, if allowed to exceed safe levels, will result in the malfunction or failure of various components 12. In order to successfully prevent such an eventuality within the restrictions as to weight and space and environmental conditions characteristic of current aircraft designs, it has become necessary to provide a highly effective cooling system for such equipment which is extremely compact, light weight, and does not require the expenditure of substantial quantities of power for its successful operation. The device illustrated in Fig. 1 successfully meets these severe design requirements by employing a relatively simple structural configuration which is relatively light weight since it includes only an inner surface which may be provided by a container or shell 14 substituted for a conventional chassis or housing for the electronic equipment to be cooled, a light weight exterior container 16 providing a spaced generally parallel outer surface, supporting means for maintaining container 14 in proper relation to container 16, and a plurality of light weight nozzle assemblies. The only additional equipment required is a pressurized relatively small reservoir of the order of two or three gallon capacity for the liquid to be discharged through the respective nozzle assemblies and conduit means interconnecting the liquid reservoir and the respective nozzle assemblies, as illustrated in alternate configurations in Figs. 4 and 6. In a typical installation, ram air, conducted through a suitable inlet duct within an airframe, is admitted to the container 16 through the inlet opening 18 so that it passes rapidly through the annular passageway 25 to the outlet opening 19 of the container 16 for discharge through a suitable outlet duct to the exterior of an airframe in which this device is installed. Notwithstanding the narrow confines of the passageway 25 and the absence of a high capacity blower or other suitable means to produce a high velocity of air flow therein with the accompanying turbulence ordinarily necessary to insure a relatively rapid rate of heat transfer, the instant invention achieves the same effect without the weight and power penalties of such equipment by the turbulent diffusion of a substantial quantity of liquid droplets into the entering air through nozzle assemblies 21" disposed adjacent to inlet opening 18 and subsequently by means of turbulent diffusion of the additional liquid droplets discharged by the series of nozzle assemblies 21'. Meanwhile, the inevitable losses with respect to heat transfer due to film resistance to heat transfer induced by the inevitable laminar flow of the air along the surface of the container 14 is offset by the cool liquid-thin film 23 maintained on the surface of container 14 and the resultant evaporation of this liquid into the adjacent air stream effective to transfer substantial quantities of heat from the components 12 through the wall of the container 14 and thence through the cool liquid-thin film 23 to the air or other gas flowing through passageway 25. Meanwhile, this same cool liquid-thin film 23, sustained by the combined effect of nozzle assemblies 21' and nozzle assemblies 21, performs the functions of an effective insulating barrier between the air traversing the passageway 25 and the environment surrounding the components 12 of the electronic equipment, so effectively that the environment surrounding the components 12 may be maintained continuously at a safe temperature level even though this level be substantially below the temperature of the air being circulated through the passageway 25. Thus, the air discharged through outlet opening 19 laden with liquid vapor functions in this device solely as a carrier of vapor heat and, in fact, functions successfully in this capacity notwithstanding the fact that the entrance temperature of the air at inlet opening 18 may be substantially higher than the safe environmental temperature for electronic components 12 maintained by this device, since this device relies not upon increasing the temperature of the air between the inlet opening 18 and the outlet opening 19, but rather upon substantially increasing the enthalpy of the air and liquid vapor mixture within passageway 25 so that a substantial quantity of heat can be transferred to the mixture and thence discharged through the outlet opening 19 without any appreciable increase in the temperature of the air, and, in fact, with a reduction of the dry bulb temperature of the mixture.

In the embodiment of the instant invention shown in Fig. 2, the cooling device generally designated by the reference numeral 10 likewise includes an inner cylindrical container 14, which also serves as the chassis of the electronic equipment cooled by this device by having the various electronic components 12 mounted directly thereon for most effective heat transfer thereto, and a cylindrical outer container 16 enclosing the inner container 14 and spaced therefrom by supporting means such as spacers, struts or mounting brackets of any suitable type to maintain the proper space relationship between the respective containers so as to provide the annular passageway 25 formed by the outer surface of inner container 14 and the inner surface of outer container 16, without obstructing the flow of air or other gas. For example, struts 15, as shown in Fig. 7, may be used as the supporting means for container 14. In this embodiment, orifice assemblies 27 have been substituted for nozzle assemblies 21 in the configuration of the instant invention illustrated in Fig. 1, to indicate an alternative arrangement for applications in which orifice assemblies 27 may effectively establish a moving cool liquid-thin film protective environment 23, as described above, over the outer surface of the container 14. In addition, the showing in Fig. 2 includes a substantial quantity of high surface area packing material 29 disposed in the intermediate portion of the passageway 25. This packing material preferably comprises light weight fibrous maerial such as aluminum turnings or shavings, steel wool, or the like, disposed so that the liquid introduced through the orifice assemblies 27 which forms the cool liquid-like film 23 is also distributed uniformly over the extensive surfaces of the packing 29, in order to provide a high degree of diffusion of the liquid into the stream of air admitted through the inlet opening 18 to the passageway 25 and thence out the outlet opening 19. Due to the physical characteristics of such packing material, it may effectively supplant the nozzle assemblies 21', shown in Fig. 1, as a liquid diffusion means. In fact, the use of such packing material in this manner characteristically minimizes both gas film and liquid film resistances. Alternatively, where the demands of the system warrant such an arrangement, the extensive liquid surface provided by the packing 29 may be augmented in the embodiment shown in Fig. 2 by the provision of nozzle assemblies 21' in addition to this packing, or the nozzle assemblies 21' of Fig. 1 may be replaced in complexly curved portions of the passageway 25, as illustrated in Fig. 8, with sections of packing 29. Moreover, where the design requirements justify such a feature, nozzle assemblies 21'', mounted as shown in Fig. 1 adjacent to inlet opening 18, may also be provided in the embodiment illustrated in Fig. 2 to accelerate the turbulent diffusion of the liquid into the air stream entering through the inlet opening 18 and thereby immediately enhance the heat absorption characteristics of the resulting mixture.

The operation of the embodiment shown in Fig. 2 is substantially the same as that of the preferred embodiment as described above with diffusion of the liquid from the cool liquid-thin film 23 and with diffusion of the liquid from the extensive surfaces provided by packing 29 instead of from the surfaces of the droplets produced by nozzle assemblies 21', or in addition to such diffusion when nozzle assemblies 21' are installed to augment the packing 29.

Referring now to Fig. 3, the embodiment of the cooling device 10 shown therein includes the cylindrical inner container 14 and the cylindrical outer container 16 with an inlet opening 18 and an outlet opening 19 disposed in the same relative relationship as the corresponding parts in the embodiments shown in Figs. 1 and 2. Fig. 3, like Fig. 2, shows orifice assemblies 27 located in the upper end of the outer container 16 and so disposed as to establish a cool liquid-thin film protective environment 23 over the outer surface of the inner container 14, and, in addition, this embodiment is provided with a series of annular diffusing assemblies 30 disposed within the annular passageway 25 and extending between the outer surface of the inner container 14 and the inner surface of the outer container 16. Each of these diffusing assemblies 30, as illustrated, includes a downwardly sloped flange 31 projecting outwardly from the inner container 14 and overhanging the narrow annular opening between the outer surface of container 14 and a vertically extending circular rim 33, encircling and disposed adjacent to, but spaced from, the surface of container 14, supported as shown in Fig. 3 on the inner circumference of a flat annular plate 35 mounted upon and projecting inwardly from the inner surface of the outer container 16. With this arrangement, the elements 31, 33 and 35 together form a diffusing assembly effective to achieve through intermixture of the air flowing through passageway 25 from the inlet opening 18 to the outlet opening 19 and the liquid admitted to passageway 25 through the orifice assemblies 27. It should be understood that the diffusing assemblies in Fig. 3 are exemplary only, and that the detailed configuration of these assemblies may be varied considerably to meet specific demands of various installations, as, for example, by using various types of bubble cap assemblies mounted upon annular plates disposed transversely of the annular passageway 25 to collect shallow layers of liquid through which the circulating air may be distributed by the bubble cap assemblies. Such bubble cap assemblies may be used most effectively under circumstances where the gas film resistance is negligible and the liquid film resistance is high. However, the particular configuration of the diffusing assemblies illustrated in Fig. 3 represents an arrangement which minimizes interference with maintenance of the moving cool liquid-thin film 23 established by orifice assemblies 27 and flowing downwardly over the surface of container 14. In addition, the downwardly sloped flange 31 of each diffusing assembly 30 may be provided with a series of minute openings therethrough adjoining the surface of container 14 to further insure continuity of the cool liquid-thin film 23, or, alternatively, nozzle assemblies 21' may be mounted to project through container 16 as shown in Fig. 1 between the respective diffusing assemblies 30, to assist in maintaining the cool liquid-thin film 23 and also to augment the diffusing effect of assemblies 30, if necessary. Moreover, the embodiment shown in Fig. 3 may also be modified to include nozzle assemblies 21'' and the orifice assemblies 27 may be replaced by nozzle assemblies 21, both as shown in Fig. 1.

Although the cooling liquid diffused within the device comprising the instant invention has been referred to heretofore as water or as water in combination with some other substance, it is to be understood that the composition of this liquid may be varied as necessary in various applications to meet differing design requirements most effectively. Moreover, liquids of different compositions may be sprayed from different nozzle assemblies of the instant invention to intermix within the passageway 25. For example, one type of liquid most suitable for the establishment and maintenance of the cool liquid-thin film 23 may be sprayed from the nozzle assemblies 21 or discharged from the orifice assemblies 27 adjacent to the outlet opening 19, while another type of liquid may be most advantageous for discharge from the nozzle assemblies 21'' adjacent to the inlet opening 18. In any event, the overall combination of liquids within the passageway 25 should be that which insures the optimum heat transfer by means of the instant invention from the electronic components within the inner container 14 to the mixture discharged through outlet opening 19.

As in the embodiments shown in Figs. 1 and 2, the container 14 in the embodiment illustrated in Fig. 3 may be supported within the container 16 by struts 15, as shown in Fig. 7, or by brackets not visible in Fig. 3 which interconnect the rim 33 and the flange 31 of one or more of the diffusing assemblies 30 at intervals about their circumference. Alternatively, the container 14 may be interconnected at its opposite ends with the adjacent ends of container 16 by spaced struts or brackets or by a single rod at each end extending concentrically of the inlet opening 18 and the outlet opening 19 as shown in Figs. 1 through 4 and thence to points of attachment on the airframe which also supports container 16.

While operation of the embodiment shown in Fig. 3 is generally similar to that of the embodiments shown in Figs. 1 and 2, diffusion is effected by deflecting air or other gas flowing through passageway 25 by means of flanges 31 into contact with shallow layers of liquid collected on plates 35 to intermix the air and the liquid in addition to the diffusion from the cool liquid-thin film 23.

The embodiment of the instant invention illustrated in Fig. 4 discloses additional features which may be used in combination with the preferred embodiment of this device as shown in Fig. 1 or with the various embodiments shown in Figs. 2 and 3 to further enhance the cooling capacity of these devices. These additional features include a pressurized reservoir disposed within the chassis 14 of a given electronic equipment, from which the cooling liquid used by the instant invention may be supplied, a plurality of conduits 45 connected to the reservoir 43 and extending through the chassis 14 and projecting into the passageway 25 adjacent the outlet opening 19, and a plurality of nozzle assemblies 47 mounted on the ends of the respective conduits 45 and arranged within passageway 25 to function in a manner corresponding to the nozzle assemblies 21 in Fig. 1 or orifice assemblies 27 in Figs. 2 and 3 to establish the cool liquid-thin film 23. With this arrangement, the cooling liquid contained in reservoir 43 is forced through the conduits 45 by the pressure applied thereto within the reservoir 43 and into intimate contact with the heat sources in the various electronic components 12, either by circulation of the liquid within the components themselves where such circulation is feasible or through coils or other heat exchange means encircling or adjacent to the electronic components, as shown schematically in Fig. 4, to effect an initial transfer of heat from these components 12 to the liquid prior to its discharge from nozzle assemblies 47 into the passageway 25. With regard to the pressurization of the reservoir 43, if this tank is filled at sea level pressure prior to flight of an aircraft incorporating the instant invention, the fact that the ambient pressure at flight altitudes is lower than sea level pressure will result in a pressure differential amounting to pressurization of the reservoir or tank 43 sufficient to discharge the relatively small quantity of liquid required for operation of the instant invention at the low liquid discharge pressure typical of this device. Alternatively, the tank 43 may be pressurized prior to flight by means of a charge introduced through a suitable charging valve for the tank 43, or, for flights of long duration during which the electronic equipment to be cooled may be operated continuously, a suitable pump assembly may be interposed in the conduits 45 between the tank 43 and the nozzles 47 in a manner similar to that illustrated in Fig. 6. Finally, the passageway 25 may be provided, as shown in Fig. 4, with nozzle assemblies 21' and nozzle assemblies 21'' mounted as in the embodiment of Fig. 1, and/or with the packing 29 shown in Fig. 2, and/or with the diffusing assemblies illustrated in Fig. 3. Of course the nozzle assemblies mounted on the container 16 must either be supplied with liquid from a separate source outside container 16, or else branches of conduits 45 must be provided which extend through passageway 25 to the exterior of container 16 with such branch conduits preferably either comprising or extending through supporting means for the container 14 such as the struts 15 shown in Fig. 7.

In operation, the embodiment of the instant invention illustrated in Fig. 4 has the effect of extending the capacity of the heat transfer operation characterizing the embodiment shown in Fig. 1 by an amount reflecting the effect of the heat transfer from the electronic components directly to the liquid, such as water, prior to its diffusion in the air circulated through passageway 25.

In Fig. 5 is shown an embodiment of the instant invention in which the air inlet opening 18' is disposed tangentially of the cylindrical outer container 16 at its lower extremity so that the air admitted therethrough travels a helical path about the cylindrical inner container 14 as it traverses the annular passageway 25 between the respective containers and eventually reaches the outlet opening 19' similarly disposed tangentially of the outer container 16 at its upper extremity. The inner container 14 is maintained in a position in which it is spaced on all sides from outer container 16 by supporting means not visible in Fig. 5, such as the struts 15 shown in Fig. 7. In order to establish and maintain a cool liquid-thin film protective environment 23 about the inner container 14, the cooling device generally designated by the reference numeral 10' in Fig. 5 may be provided with nozzle assemblies 21 and 21'. Moreover, the nozzle assemblies 21' may be augmented by or be replaced by packing 29 disposed as shown in Fig. 2. While the cool liquid-thin film protective environment 23 extending over the outer surface of the container 14 is not shown in Fig. 5 in order to avoid obscuring other features of this embodiment, it is to be understood that this cool liquid-thin film is established by nozzle assemblies 21 and maintained by nozzle assemblies 21' in this embodiment of this device just as in the embodiment illustrated in Fig. 1. Furthermore, nozzle assemblies 21'' may be provided in the lower end of the container 16 as shown in Fig. 5, and the features illustrated within the container 14 in Fig. 4 may be included in the embodiment of Fig. 5 with nozzle assemblies 47 replacing or augmenting the nozzle assemblies 21 located in the upper end of the container 16.

Operation of the embodiment illustrated in Fig. 5 is similar to operation of the other embodiments discussed above with the exception that the substantially axial flow of air from the air inlet opening 18 to the air outlet opening 19 characteristic of all of the previously illustrated embodiments is replaced by a spiral flow of air circumferentially of the inner container 14, as indicated by the dotted lines in Fig. 5, as the air travels from the inlet opening 18' to the outlet opening 19' disposed as shown in Fig. 5. Hence, the path traveled by the air within the container 16 is substantially extended so that a greater opportunity is afforded for the intermixture of the air and the cooling liquid, such as water or a water solution of a suitable composition, to assure a maximum cooling effect. In addition, the continuing angular deflection of the air stream within the container resulting from the tangential disposition of the inlet opening and the outlet opening produces a substantial reduction in velocity of the air as compared to its inlet velocity, a characteristic effective to prevent deleterious entrainment of liquid in the air stream when the air is admitted to the container at a high Mach number.

The showing in Fig. 6 constitutes a simplified schematic representation of a cooling system for airborne electronic equipment embodying two or more units of the device comprising the instant invention, as illustrated in Figs. 1 through 5, connected in series for most efficient operation. In Fig. 6, cooling air or other suitable gas is admitted through the inlet 62 to a first cooling device 60 enclosing electronic equipment operating at a relatively low temperature wherein it is mixed in the manner described above with a suitable cooling liquid such as water supplied from tank 70, either by a pump assembly 72 as shown or by pressurization of tank 70 in the manner described above with regard to reservoir 43 in Fig. 4, through a conduit 74 to suitable orifice assemblies or nozzle assemblies 76 mounted upon the cooling device 60. The air and liquid vapor mixture discharged from the outlet 64 of the cooling device 60 is conveyed by appropriate ducting to the inlet 82 of a second cooling device 80, while any excess liquid not diffused into the air within the cooling device 60 is conveyed by means of conduit 78 to suitable orifice assemblies or nozzle assemblies 76 mounted upon cooling device 80 in which the mixing of the air and the liquid supplied thereto is used in the same manner to cool electronic equipment installed within the cooling device 80 which is capable of operating at a temperature relatively higher than that of the equipment cooled by the device 60. In the event that the supply of liquid through conduit 78 to the cooling device 80 is insufficient, it may be augmented by a by-pass conduit 88, shown in dotted lines in Fig. 6, interconnecting conduits 74 and 78. In this manner, a series of cooling devices embodying the teachings of the instant invention may be effectively coordinated to exploit the heat capacity of the gas and liquid mixture, used as the cooling agent in the instant invention, at different temperature levels and thereby cool various electronic equipments capable of functioning at successively hotter operating temperatures. Although the structural details of the respective cooling devices 60 and 80 have been omitted in the simplified showing of Fig. 6, it is to be understood that each of these devices may be constructed independently of the other according to the teachings of one or more of Figs. 1 through 5, as necessary, to meet the design requirements of the particular assembly. Hence, the showing in Fig. 6 of the assemblies 76 is only broadly representative of the various nozzle assembly and orifice assembly configurations illustrated in Figs. 1 through 5. Furthermore, it should be understood that the number of cooling devices which may be interconnected as shown in Fig. 6 is not intended to be limited to two, but may include as many such devices as necessary to effectively cool various items of electronic equipment found within an aircraft.

In yet another embodiment of the instant invention, discussed in greater detail in copending patent application, Serial No. 664,865, filed June 10, 1957, the electronic equipment to be cooled by a single unit of the instant invention may be arranged so that components operating at different temperature levels may be located in a hotter zone and in a cooler zone which may be separated by the structure forming the cooling device of the instant invention to further insulate the components enclosed in the cooler zone from the temperature generated in the hotter zone of the electronic equipment.

In addition to the various possible modifications described above, the instant invention is inherently highly flexible with respect to its ready adjustability in response to widely changing environmental requirements and varied operating requirements. For example, as illustrated in Fig. 1, any suitable flow adjusting means such as valve assemblies 91 may be interposed in the conduits 93 supplying the respective nozzle assemblies 21, 21' and 21'' to regulate the flow of the cooling liquid selectively, and flow controlling means of any suitable type such as the butterfly valve assembly 95 may be located in the air inlet duct to regulate the flow of air through the cooling device 10. Thus, by adjustment of the rate of spray of the cooling liquid as by modifying the rate of flow or by closing certain nozzles entirely, or by regulating the flow of air with valve assembly 95, or by both such adjustments in combination, the instant invention is capable of a high degree of control of the diffusion of mass therein and hence of the heat transfer thereby. Moreover, under extreme conditions such as operation at extremley high altitudes with no appreciable quantity of air available for use as a carrier of vapor heat, the instant invention will provide a measure of cooling solely by evaporation of the liquid.

While ideally the quantity of liquid coolant fluid discharged into a cooling device of the instant invention may be regulated to leave no excess of liquid which is not diffused as vapor into the air passing through the device, practical considerations dictate the provision of a small excess quantity of liquid which may be drained from the bottom of the assembly 10 as through inlet opening 18 in Figs. 1 through 4 or through a separate outlet such as that shown in Fig. 6. In fact, it is this excess of liquid which is a significant factor in the successful operation of the multiple configuration illustrated in Fig. 6.

Thus, the instant invention provides a cooling system particularly suited for maintaining airborne electronic equipment at safe operating temperatures which is characterized by the fact that it makes simultaneous mass transfer of heat a predominant means of cooling over sensible heat transfer and thereby relegates the air used to the minor role of a carrier of vapor heat rather than its former major role of coolant, whereby this cooling system can be operated successfully at high altitudes of flight where relatively small quantities of air are available and also at sea level where only extremely high temperature ram air is available during operations at high Mach numbers; that it reduces or completely eliminates the adverse effect of stagnant gas film resistances characteristics of conventional types of heat exchangers by providing direct contact between the gas and liquid films at the same time that it provides turbulent heat transfer conditions in the core by the artificial stimulating action of the small liquid droplets and by eliminating the center dividing wall characteristic of conventional types of heat exchangers; that it provides for a rapidly moving cool liquid-thin film protective environment over the entire intermediate heat transfer surface of the electronic equipment to maintain the housing or chassis of the electronic equipment at a satisfactory temperature level regardless of the high temperature ambient air surrounding the equipment; that it is effective to change the heat capacity properties of the air used immediately after it enters the cooling device of the instant invention so that an increase of enthalpy of the fluid including air, used as a coolant, is not manifested by high temperature rise of the coolant fluid, that it provides an accelerated vapor heat diffusion path in the laminer and core layers in addition to sensible heat transfer; that it provides a system which utilizes the latent heat of vaporization at relatively low temperatures of about 80 degrees F.; and that it provides a liquid vapor fluid which, after cooling electronic equipment, can be used for further cooling another heat source operating in the airframe at a higher temperature level.

Obviously many modifications and variations of the present invention are possible in the light of the above

What is claimed is:

1. A thermal diffusion cooling device comprising a first relatively smaller container enclosing and directly connected to at least one heat source, a second relatively larger container fixedly mounted relative to said first container enclosing and uniformly spaced on all sides from said first container to form a passageway of a substantially constant transverse dimension therebetween fully enclosing said first container, said second container including an inlet opening at one extremity thereof and an outlet opening at the other extremity thereof for the circulation of a gaseous fluid through the passageway between said first and said second containers in a substantially uniform unidirectional flow from said inlet opening to said outlet opening and on all sides of said first container, means for maintaining a cool liquid-thin film over substantially the entire outer surface of the inner container, and means for maintaining a large liquid surface area throughout the passageway defined by said first and said second containers.

2. A device as described in claim 1, in which said last named means comprises a plurality of nozzle assemblies mounted upon the second relatively larger container and directed into the passageway defined by said second container and said first container.

3. A device as described in claim 1, in which said last named means comprises fibrous material packed in the intermediate portion of the passageway defined by said first and said second containers.

4. A device as described in claim 1, in which said last named means comprises a series of diffusing assemblies disposed within the passageway defined by said first and said second containers, each of which includes a flat annular plate projecting inwardly from the inner surface of said second container, a circular rim projecting upwardly from the inner edge of said flat plate, and a downwardly sloped flange projecting outwardly from the outer surface of said first container and overhanging said rim, each said downwardly sloped flange being provided with a series of minute openings adjoining the surface of said first container.

5. A thermal diffusion cooling device comprising a first relatively smaller generally cylindrical inner container including a shell of heat conductive material enclosing and directly connected to a plurality of heat sources, a second relatively larger generally cylindrical outer container enclosing and uniformily spaced on all sides from said first container to form an annular passageway of a substantially constant transverse dimension therebetween fully enclosing said first container, said second container including a gaseous fluid inlet opening at one end thereof and a gaseous fluid outlet opening at the other end thereof for the circulation of a gaseous fluid through the passageway defined by said containers, liquid discharging means mounted to discharge between said first container and said second container and operable to establish a cool liquid-thin film over substantially the entire outer surface of said inner container, and liquid diffusing means for maintaining an extensive liquid surface area within the annular passageway defined by said first and said second containers.

6. A device as described in claim 5, in which the liquid admitted to said passageway via said liquid discharging means is delivered from a reservoir to a succession of conduits arranged to bring the liquid into intimate heat exchange relationship with the respective heat sources enclosed by and connected to said first relatively small container.

7. A device as described in claim 5, wherein said liquid diffusing means comprises a plurality of nozzle assemblies mounted at spaced intervals circumferentially of the generally cylindrical outer container and directed into the passageway defined by said first and said second containers.

8. A device as described in claim 5, wherein said liquid diffusing means comprises a quantity of fibrous packing material filling the portion intermediate the ends of the annular passageway defined by said first container and said second container.

9. A device as described in claim 5, wherein said liquid diffusing means includes a plurality of nozzle assemblies mounted at spaced intervals circumferentially of the generally cylindrical outer container and directed into the passageway defined by said first and said second containers, and a quantity of fibrous packing material substantially filling the portion of said annular passageway intermediate its ends.

10. A device as described in claim 5, wherein said liquid diffusing means comprises a series of annular diffusing assemblies disposed at spaced intervals within the passageway defined by said first and said second containers, each of which includes a flat annular plate mounted upon and projecting inwardly from the inner surface of said outer container, a circular rim connected to and projecting upwardly from the inner edge of said flat plate and spaced from the outer surface of said inner container, and a downwardly sloped flange mounted upon and projecting outwardly from the outer surface of said inner container and overhanging said rim, each said downwardly sloped flange being provided with a series of minute openings therethrough adjoining the surface of said first container.

11. A thermal diffusion cooling device for airborne electronic equipment, comprising a first relatively smaller vertically disposed generally cylindrical inner container fully enclosing and directly supporting at least one electronic component which characteristically generates heat in operation, a second relatively larger vertically disposed elongated generally cylindrical outer container enclosing and spaced a predetermined amount on all sides from said inner container, thereby forming an annular passageway of predetermined transverse dimensions therebetween, a gaseous fluid inlet opening at the lower end of said outer container, a gaseous fluid outlet opening at the upper end of said outer container, liquid discharging means mounted upon said outer container adjacent to said outlet opening and operable to establish a cool liquid-thin film protective environment over the outer surface of said inner container, and liquid diffusing means for maintaining an extensive liquid surface area within the annular passageway defined by said inner and said outer containers including a plurality of nozzle assemblies mounted at spaced intervals both circumferentially and vertically of the generally cylindrical outer container and respectively directed into the passageway.

12. A device as described in claim 11, in which said nozzle assemblies are so disposed as to produce a liquid spray countercurrent to the flow of gaseous fluid from said inlet opening to said outlet opening through the passageway.

13. A device as described in claim 11, in which said nozzle assemblies are so disposed as to produce a liquid spray concurrent with the flow of gaseous fluid from said inlet opening to said outlet opening through the passageway.

14. A device as described in claim 11, wherein the liquid admitted to the passageway defined by said inner and said outer containers via said liquid discharging means is transferred from a tank within said inner container to said liquid discharging means through conduit means arranged to bring the liquid into intimate heat exchange relationship with at least one electronic component within the inner container which characteristically generates heat in operation.

15. A device as described in claim 11, wherein said inlet opening and said outlet opening are both disposed substantially tangentially of the circumferential surface of said outer container, whereby the gaseous fluid admitted through the inlet opening and discharged through the outlet opening is directed along an extended spiral path within the annular passageway defined by said inner and said outer containers.

16. A thermal diffusion cooling device for airborne electronic equipment, comprising a first relatively smaller vertically disposed generally cylindrical inner container fully enclosing and directly supporting at least one electronic component which characteristically generates heat in operation, a second relatively larger vertically disposed elongated generally cylindrical outer container enclosing and spaced a predetermined amount on all sides from said inner container, thereby forming an annular passageway of predetermined transverse dimensions therebetween, a gaseous fluid inlet opening at the lower end of said outer container, a gaseous fluid outlet opening at the upper end of said outer container, liquid discharging means mounted upon said outer container adjacent to said outlet opening and operable to establish a cool liquid-thin film protective environment over the outer surface of said inner container, and liquid diffusing means for maintaining an extensive liquid surface area within the annular passageway defined by said inner and said outer containers comprising a quantity of fibrous packing material filling the portion intermediate the ends of the annular passageway defined by said inner and said outer container.

17. A device as described in claim 16, wherein the liquid admitted to the passageway defined by said inner and said outer containers via said liquid discharging means is transferred from a tank within said inner container to said liquid discharging means through conduit means arranged to bring the liquid into intimate heat exchange relationship with at least one electronic component within the inner container which characteristically generates heat in operation.

18. A device as described in claim 16, wherein said inlet opening and said outlet opening are both disposed substantially tangentially of the circumferential surface of said outer container, whereby the gaseous fluid admitted through the inlet opening and discharged through the outlet opening is directed along an extended spiral path within the annular passageway defined by said inner and said outer containers.

19. A thermal diffusion cooling device for airborne electronic equipment, comprising a first relatively smaller vertically disposed generally cylindrical inner container fully enclosing and directly supporting at least one electronic component which characteristically generates heat in operation, a second relatively larger vertically disposed elongated generally cylindrical outer container enclosing and spaced a predetermined amount on all sides from said inner container, thereby forming an annular passageway of predetermined transverse dimensions therebetween, a gaseous fluid inlet opening at the lower end of said outer container, a gaseous fluid outlet opening at the upper end of said outer container, liquid discharging means mounted upon said outer container adjacent to said outlet opening and operable to establish a cool liquid-thin film protective environment over the outer surface of said inner container, and liquid diffusing means for maintaining an extensive liquid surface area within the annular passageway defined by said inner and said outer containers including a plurality of nozzle assemblies mounted at spaced intervals both circumferentially and vertically of the generally cylindrical outer container and respectively directed into the passageway defined by said inner and said outer containers, and a quantity of fibrous packing material substantially filling the portion of the annular passageway intermediate its ends.

20. A device as described in claim 19, wherein the liquid admitted to the passageway defined by said inner and said outer containers via said liquid discharging means is transferred from a tank within said inner container to said liquid discharging means through conduit means arranged to bring the liquid into intimate heat exchange relationship with at least one electronic component within the inner container which characteristically generates heat in operation.

21. A device as described in claim 19, wherein said inlet opening and said outlet opening are both disposed substantially tangentially of the circumferential surface of said outer container, whereby the gaseous fluid admitted through the inlet opening and discharged through the outlet opening is directed along an extended spiral path within the annular passageway defined by said inner and said outer containers.

22. A thermal diffusion cooling system for a plurality of electronic equipments operating at discrete temperature levels, said system being composed of at least two cooling devices; each of which includes a relatively smaller inner container enclosing and directly supporting at least one electronic component which generates heat in operation and capable of operating at a predetermined temperature, a relatively larger outer container enclosing and spaced on all sides from said inner container to form an annular passageway therebetween, liquid discharging means mounted to discharge into the space between said outer and inner containers and operable to establish a cool liquid-thin film over the outer surface of the inner container, liquid diffusing means for maintaining extensive liquid surfaces within the passageway defined by the inner and the outer containers, a gaseous fluid inlet opening at one extremity of said outer container, and a gaseous fluid outlet opening at the other extremity of said outer container; means interconnecting the outlet opening of a first cooling device enclosing an electronic component capable of operating at a relatively lower temperature with the inlet opening of a second cooling device enclosing an electronic component capable of operating at a relatively higher temperature; and means for conducting undiffused liquid from the outer container of the first cooling device to the liquid discharging means of said second cooling device.

23. A device as described in claim 22, wherein said liquid diffusing means of at least one said cooling device comprises a plurality of nozzle assemblies mounted at spaced intervals upon the outer container and directed into the annular passageway defined by said inner and said outer containers.

24. A device as described in claim 22, wherein said liquid diffusing means of at least one said cooling device comprises a quantity of fibrous packing material filling the portion intermediate the ends of the annular passageway defined by said inner and said outer containers.

25. A device as described in claim 22, wherein said liquid diffusing means of at least one said cooling device includes a plurality of nozzle assemblies mounted at spaced intervals upon the outer container and directed into the annular passageway defined by said inner and said outer containers, and a quantity of fibrous packing material substantially filling the portion, intermediate the ends of the annular passageway.

26. A device as described in claim 22, in which the liquid admitted to the annular passageway of at least one said cooling device via said liquid discharging means is transferred from a tank within said inner container to said liquid discharging means through conduit means arranged to bring the liquid into intimate heat exchange relationship with at least one electronic component within the inner container thereof which generates heat in operation.

27. A device as described in claim 22, in which the inlet opening and the outlet opening of at least one said cooling device are disposed substantially tangentially of the circumferential surface of said outer container thereof.

28. A thermal diffusion cooling system for electronic equipment having various assemblies operating at discrete temperature levels, said system comprising a plurality of cooling devices sequentially interconnected according to the operating temperature levels of the respective electronic components which they enclose; each cooling device including a relatively smaller inner container enclosing and directly supporting at least one electronic component which generates heat and operates at a predetermined safe temperature, a relatively larger outer container enclosing and spaced on all sides from said inner container to form an annular passageway therebetween, a gaseous fluid inlet opening at the lower extremity of said outer container, a gaseous fluid outlet opening at the upper extremity of said outer container, liquid discharging means mounted to discharge into the passageway defined by said inner container and said outer container adjacent said outlet opening, and liquid diffusing means for maintaining extensive liquid surfaces within the passageway defined by the inner and the outer containers; gaseous fluid ducting means interconnecting the inlet opening of each cooling device interposed in said system with the outlet opening of a cooling device enclosing an electronic component which operates at a relatively lower predetermined safe temperature and the outlet opening of each cooling device interposed in said system with the inlet opening of a cooling device enclosing an electronic component which operates at a relatively higher predetermined safe temperature; and fluid conduit means interconnecting the liquid discharging means of each cooling device interposed in said system with the outer container of a cooling device enclosing an electronic component which operates at a relatively lower predetermined safe temperature and the outer container of each cooling device interposed in said system with the liquid discharging means of a cooling device enclosing an electronic component which operates at a relatively higher predetermined safe temperature.

29. A thermal diffusion cooling device for airborne electronic equipment, comprising a first relatively smaller vertically disposed generally cylindrical inner container fully enclosing and directly supporting at least one electronic component which generates heat in operation, a second relatively larger vertically disposed elongated generally cylindrical outer container enclosing and spaced a predetermined amount on all sides from said inner container, thereby forming an annular passageway of predetermined transverse dimensions therebetween, a gaseous fluid inlet opening at the lower end of said outer container, adjustable means for regulating the flow of gaseous fluid through said inlet opening, a gaseous fluid outlet opening at the upper end of said outer container, liquid discharging means mounted upon said outer container adjacent to said outlet opening and operable to establish a cool liquid-thin film protective environment over the outer surface of said inner container, adjustable means for controlling the flow of liquid through said liquid discharging means, liquid diffusing means for maintaining an extensive liquid surface area within the annular passageway defined by said inner and said outer containers including a plurality of nozzle assemblies mounted at spaced intervals both circumferentially and vertically of the generally cylindrical outer container and respectively directed into the passageway, and adjustable means for controlling the flow of liquid through said liquid diffusing means, whereby said cooling device is rendered highly responsive to changing environmental conditions and operating requirements.

30. A thermal diffusion cooling device for airborne electronic equipment, comprising a first relatively smaller cylindrical inner container enclosing and directly supporting at least one electronic component which generates heat in operation, a second relatively larger cylindrical container enclosing and spaced from said inner container to form an annular passageway therebetween, a gaseous fluid inlet opening at the lower end of said outer container and disposed substantially tangentially thereof, a gaseous fluid outlet opening at the upper end of said outer container and disposed substantially tangentially thereof, liquid discharging means mounted to discharge between the upper ends of said outer and inner containers and operable to establish a cool liquid-thin film protective environment over the outer surface of said inner container, and light diffusing means for maintaining an extensive liquid surface area within the annular passageway defined by said inner and said outer containers, the liquid admitted to the passageway defined by said inner and said outer containers via said liquid discharging means being transferred from a tank within said inner container to said liquid discharging means through conduit means arranged to bring the liquid into intimate heat exchange relationship with at least one electronic component within the inner container which characteristically generates heat in operation.

References Cited in the file of this patent

UNITED STATES PATENTS

| | | |
|---|---|---|
| 927,571 | Merralls | July 13, 1909 |
| 947,627 | Doran | Jan. 25, 1910 |
| 990,182 | Amsbary | Apr. 18, 1911 |
| 1,156,525 | Gay | Oct. 12, 1915 |
| 1,472,051 | Davis | Oct. 30, 1923 |
| 1,708,600 | Beckman | Apr. 9, 1929 |
| 1,798,563 | Styrud | Mar. 31, 1931 |
| 2,643,282 | Greene | June 23, 1953 |
| 2,734,096 | Ennis | Feb. 7, 1956 |

FOREIGN PATENTS

| | | |
|---|---|---|
| 465,264 | Germany | Sept. 12, 1928 |